(12) United States Patent
Houis

(10) Patent No.: US 7,597,628 B2
(45) Date of Patent: Oct. 6, 2009

(54) MULTILOBED SOCKET FOR PROTECTION OF VEHICLE TRANSMISSION AND TRANSMISSION JOINT EQUIPPED WITH SUCH A SOCKET

(75) Inventor: Jacques Houis, Thouare sur Loire (FR)

(73) Assignee: Trelleborg Prodyn, Carquefou (FR)

( * ) Notice: Subject to any disclaimer, the term of this patent is extended or adjusted under 35 U.S.C. 154(b) by 0 days.

(21) Appl. No.: 11/792,711

(22) PCT Filed: Dec. 7, 2005

(86) PCT No.: PCT/FR2005/003063

§ 371 (c)(1),
(2), (4) Date: Jun. 11, 2007

(87) PCT Pub. No.: WO2006/064108

PCT Pub. Date: Jun. 22, 2006

(65) Prior Publication Data

US 2008/0080927 A1     Apr. 3, 2008

(30) Foreign Application Priority Data

Dec. 15, 2004   (FR) .................................. 04 13330

(51) Int. Cl.
*F16D 3/84* (2006.01)
(52) U.S. Cl. ......................... 464/175; 464/111; 403/50
(58) Field of Classification Search ............... 403/50, 403/51, 134; 277/634–636; 464/111, 175
See application file for complete search history.

(56) References Cited

U.S. PATENT DOCUMENTS

| | | | |
|---|---|---|---|
| 5,529,538 A * | 6/1996 | Schulz et al. ............... 464/111 |
| 6,089,574 A * | 7/2000 | Sadr et al. .................... 277/636 |
| 6,402,999 B1 * | 6/2002 | Sadr et al. .................... 264/68 |
| 7,297,066 B2 * | 11/2007 | Ohshita ...................... 464/175 |
| 7,396,286 B2 * | 7/2008 | Sueoka et al. ............... 464/175 |
| 2002/0043772 A1 * | 4/2002 | Huchet et al. ............... 277/634 |
| 2004/0056434 A1 * | 3/2004 | Wolf et al. .................. 277/634 |
| 2005/0082769 A1 * | 4/2005 | Scholtz et al. .............. 277/635 |
| 2007/0042827 A1 * | 2/2007 | Deisinger ................... 464/175 |
| 2008/0157484 A1 * | 7/2008 | Briton ........................ 277/636 |

FOREIGN PATENT DOCUMENTS

EP     1 182 372 A2    2/2002

* cited by examiner

*Primary Examiner*—Michael P Ferguson
*Assistant Examiner*—Joshua T Kennedy
(74) *Attorney, Agent, or Firm*—Young & Thompson

(57) ABSTRACT

A transmission joint consists of two drive shafts connected by an articulated mechanical connection. This connection is protected by an elastic socket, such as a sealing bellows, connecting the shafts. One end of this socket is multilobed to cover upon contact a multilobed element of the articulated mechanical connection and works with a tightening element of the collar type that surrounds the multilobed end of the socket. The multilobed end of the protective socket has, to the right of the zones of greater thickness of the multilobed wall, a reinforcement of the thickness to obtain an external radial bulge of the wall of the socket, at least when mounted on the multilobed connection element. The bulge works with the collar type tightening element to balance the tightening forces between the thin and reinforced portions of the multilobed wall.

13 Claims, 3 Drawing Sheets

MULTILOBED SOCKET FOR PROTECTION OF VEHICLE TRANSMISSION AND TRANSMISSION JOINT EQUIPPED WITH SUCH A SOCKET

This invention relates to a transmission joint of the type that consists of two drive shafts connected by an articulated mechanical connection, whereby this connection is protected by an elastic socket, such as a sealing bellows, as well as the sealing bellows itself.

In vehicles, between the transmission and the wheels of the vehicle, a transmission that consists of two shafts connected to one another via a mechanical transmission element that requires lubrication is provided. In general, the shaft that comes from the transmission is equipped with a bell that constitutes the female element of the transmission element that connects this first shaft to the second drive shaft. This female element assumes the shape of a generally trilobed cavity. The lobes thus delimit housings that are each designed to accommodate, for example, a roller. Each roller is carried by a male element that has three roller bearings. This male element is itself coupled to the drive shaft. A protective socket of such a homokinetic tripodal joint of the type that is described above comprises a cylindrical-conical bellows that, at one end, comprises a large multilobed base that, in the mounted state, is applied to the external surface of the bell or bowl of the joint. This large base therefore has an inside surface that has a shape that is complementary to the external shape of the multilobed bell. In the mounted state of the socket on said bell, a ring or collar surrounds the large base of the socket that comes in the form of a circular surface that is concentric to the longitudinal axis of the socket to apply the multilobed surface of this large base against the periphery of the bell. The small base of the socket is attached to the drive shaft that is integral with the male element of the joint.

Such an assembly is well known to those versed in this technique and is described in particular in the European Patent EP-A-1,182,372. In the prior art, it is therefore conventional for the large base of the socket to have, in the mounted state on the multilobed bell, a circular external shape that is concentric to the median longitudinal axis of the socket. The force of tightening the socket on the bell, generated by the tightening element of the collar or ring type, thereby varies locally. This tightening force is significant in the zones of smaller thickness of the multilobed wall of the socket, whereas it is low in the zones of the greater thickness of the wall. In these zones, the tightening may then be insufficient to obtain the desired sealing.

One object of this invention is therefore to propose a transmission joint whose design makes it possible in particular to balance the tightening forces of the socket on the bell between the thin portions and the reinforced portions of the multilobed wall of the socket.

Another object of this invention is to propose a protective socket that can be subjected to a tightening force that produces a constant force on the multilobed element of the articulated mechanical connection of the transmission joint, in the mounted state of the socket on the multilobed connection element of the transmission.

For this purpose, the invention has as its object a transmission joint of the type that consists of two drive shafts that are connected by an articulated mechanical connection, whereby this connection is protected by an elastic socket, such as a sealing bellows, connecting the two shafts, whereby one end of this socket is made multilobed to cover upon contact a multilobed element of the articulated mechanical connection and works with a tightening element of the collar type that surrounds the multilobed end of the socket, characterized in that the multilobed end of the protective socket has, at the multilobed wall, preferably to the right of the zones of greater thickness of the multilobed wall, a reinforcement of the thickness to obtain an external radial bulge of the wall of said socket, at least in the mounted state of the socket on the multilobed connection element, whereby this bulge works with the tightening element of the collar type preferably to balance the tightening forces between the thin portions and the reinforced portions of the multilobed wall.

Thanks to the presence of this external radial bulge of the wall of the socket, a more significant force of this tightening element on the projecting external radial portion than on the remainder of the periphery of the socket results during the application of a tightening element of the collar or ring type around the multilobed end of the socket so as to balance the tightening forces at the level of the entire periphery of said wall, regardless of the geometric shape of this wall.

The invention also has as its object a protective socket of the articulated mechanical connection that links two drive shafts of a transmission joint, whereby one end of said socket is made multilobed to cover upon contact a multilobed element of the articulated mechanical connection and works with a tightening element of the collar type that surrounds the multilobed end of said socket, characterized in that the multilobed end of the protective socket has, at the multilobed wall, preferably to the right of the zones of greater thickness of the multilobed wall, a reinforcement of the thickness to obtain an external radial bulge of the wall of said socket, at least in the mounted state of the socket on the multilobed connection element, whereby this bulge works with the tightening element of the collar type preferably to balance the tightening forces between the thin portions and the reinforced portions of the wall of the socket.

The protective socket is more particularly designed to be integrated with a transmission joint of the above-mentioned type.

The invention will be properly understood from reading the following description of embodiments, with reference to the accompanying drawings in which.

Figure 1:
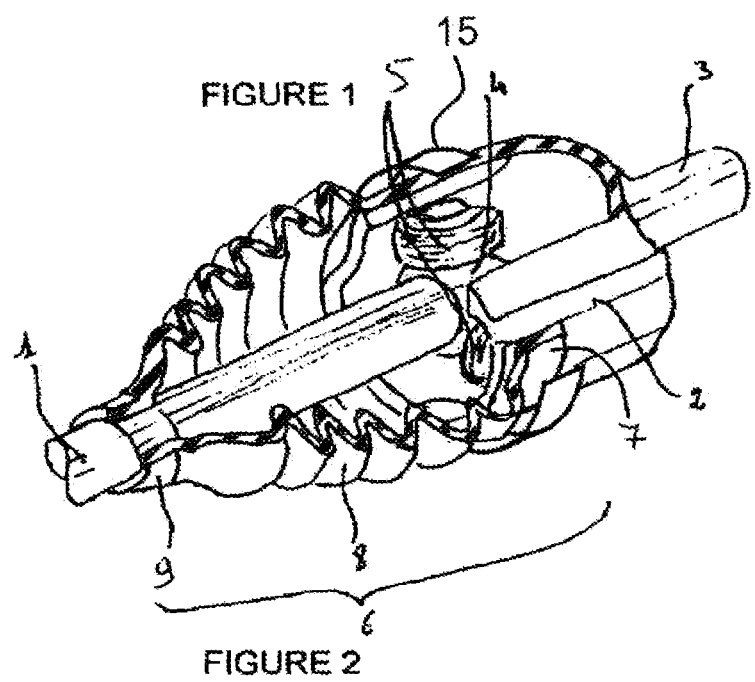
FIG. 1 shows a partial general outline of a transmission joint according to the invention.

As mentioned above, the socket 6, object of the invention, is designed to protect a transmission of the type according to the one shown in FIG. 1. The transmission joint thus comprises two shafts, shown at 1 and 3 in the figures, as well as an articulated transmission element 2, 4 that connects the two shafts 1, 3 to one another. This transmission element consists of a male element that has, for example, three roller bearings spaced angularly by 120° from one another and a female element 2. The female element 2, also called a bell, has housings that are each designed to accommodate a roller 5. The male element of the seal is integral with the transmission shaft that is shown at 1 in the figures while the female element or bell 2 of the seal is coupled to the shaft 3 that is obtained from the transmission optionally by being made of a single piece with the latter. The socket is designed to protect this joint and is attached by its large multilobed base 7 to the periphery of the bell 2 that constitutes the female element of the joint that is integral with the shaft 3 while its small base 9 is attached to the transmission shaft 1 that is integral with the male element 4 of the joint. The bellows 8 of this socket therefore extends between the large multilobed base 7 and the small base 9 of said socket. Quite obviously, other embodiments of a transmission of the type of the one that is mentioned above can be considered.

The end 7 of the socket 6, which is made multilobed and which constitutes the large base of said socket when the body of the socket 6 assumes the shape of a cylindrical-conical body, is arranged to cover upon contact the multilobed element 2 or the bell of the articulated mechanical connection. This multilobed end 7 of the socket 6 also works with a tightening element, generally consisting of a collar 15 or a ring that surrounds the multilobed end 7 of the socket 6 to keep this socket 6 on the outside periphery of the bell 2 in the mounted state of the socket on the element 2 of multilobed connection and to ensure sealing. Thus, the large base 7 of the socket has bulges inside that are distributed circumferentially and that have a generally curved shape, in particular in an arc, designed to form the lobes of the socket. These zones of the wall of the multilobed end 7 of the socket are called zones 10 of greater thickness. These lobes are connected to one another by a circular wall segment that may or may not be reinforced and that is called a non-lobed wall 11 of the socket or else a thin portion of the multilobed wall of the socket. This socket 6 of a general cylindrical-conical shape also has a socket body that assumes, between the large base 7 and the small base 9, the shape of a cylindrical-conical body that is equipped with a number of coils designed to constitute the elements of the bellows 8. In the examples shown, the socket 6 and the connection element 2 are of the trilobed type, which is the most frequently encountered case. Quite obviously, the number of lobes can vary without exceeding the scope of the invention In a manner that is characteristic of the invention, the multilobed end 7 of the protective socket 6 has, generally to the right of the zones 10 of greater thickness of the multilobed wall, a reinforcement 13, 14 of the thickness that is able to form, alone or in cooperation with the multilobed connection element 2, in the mounted state of the socket on the multilobed connection element 2, an external radial bulge 12 of the wall of said socket 6. This external radial bulge 12 imparts to the outside face of the multilobed wall a non-circular shape, i.e., not coaxial to the longitudinal axis of the socket body contrary to the prior art. This bulge 12 is more particularly visible in FIG. 6. This bulge 12 thus works with the tightening element of the collar type that is applied to the periphery of the multilobed end 7 of the socket 6, in particular to balance the tightening forces between the thin portions and the reinforced portions of the multilobed wall. Actually, because of the absence of a perfectly circular embodiment of the wall, i.e., concentrically to the longitudinal axis of the socket body when the tightening element is going to be applied, it will, in a first step, compress the reinforced portions or zone 10 of greater thickness of the multilobed end 7 of the socket 6, to the right of the bulge 12, before being applied to and tightening the portions 11 of lesser thickness. The tightening force of the socket 6 on the bell, called "tightening force," directly linked to the tightening value expressed in percent and corresponding to the formula: [(initial thickness of the wall−final thickness of the wall)/initial thickness of the wall] thereby offers values that are essentially identical to the entire periphery of the wall.

In general, the reinforcement 13, 14, which is reflected by an increase in the thickness of the multilobed wall of the socket, is provided in the zone of the lobes of said socket 6 or in the connection zone between portion of lobed wall 10 and portion of non-lobed wall 11. Such bulges are distributed locally on the surface of the periphery of the multilobed wall in the location of the zones of the wall that have to be subjected to a more intense tightening force.

Figure 2:
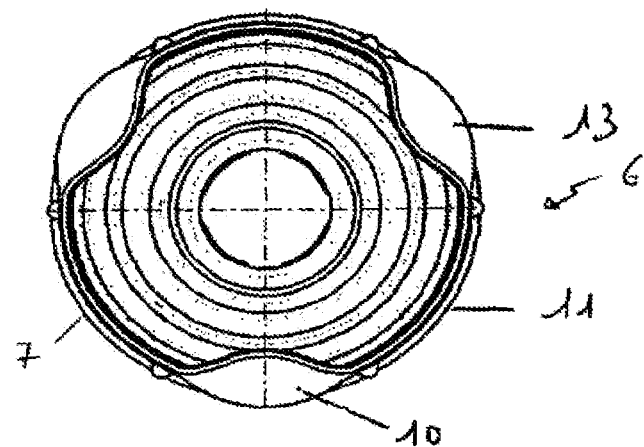
FIG. 2 shows a side view of the large base of a multilobed socket according to the invention.
Figure 3:
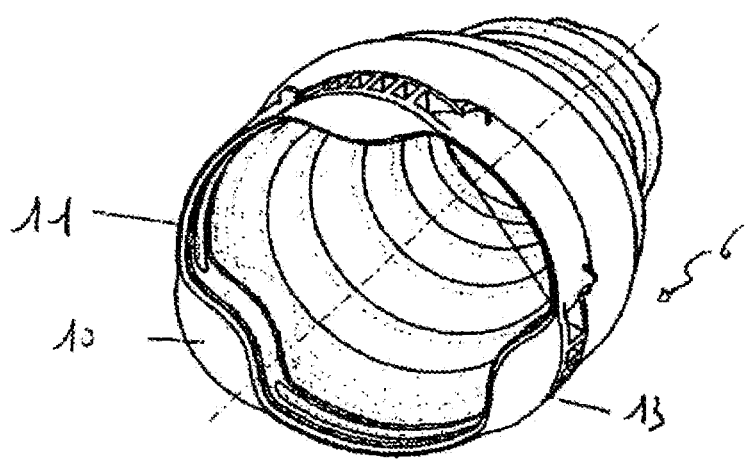
FIG. 3 shows a perspective view of the socket of FIG. 2.

Two embodiments of the external radial bulge 12 can be considered. In a first embodiment that corresponds to FIGS. 2 and 3, the reinforcement 13 is provided by an extra external radial thickness of the multilobed wall of the socket 6. Thus, in this first embodiment and as FIG. 2 illustrates, the socket has, in the non-mounted state on the bell 2, a multilobed end 7 that is not circular externally, in particular not concentric or not coaxial to the median longitudinal axis of the socket. Actually, in the zone of the lobes of the socket or in the connection zone between portion of the lobed wall and portion of the non-lobed wall, the multilobed end 7 of the socket 6 has portions of the wall that radially project to the outside and that will first be compressed during the application of the tightening element. This compression of the zones of greater thickness is present by itself until the tightening element reaches the zones 11 of lesser thickness of the multilobed wall. Then, the continuation of the tightening makes it possible to compress the entire periphery of the socket. Thanks to this pre-compression of the zones 10 of greater thickness, an approximately equal tightening force between the thin portions and the reinforcement portions of the multilobed wall is ultimately obtained.

Figure 4:
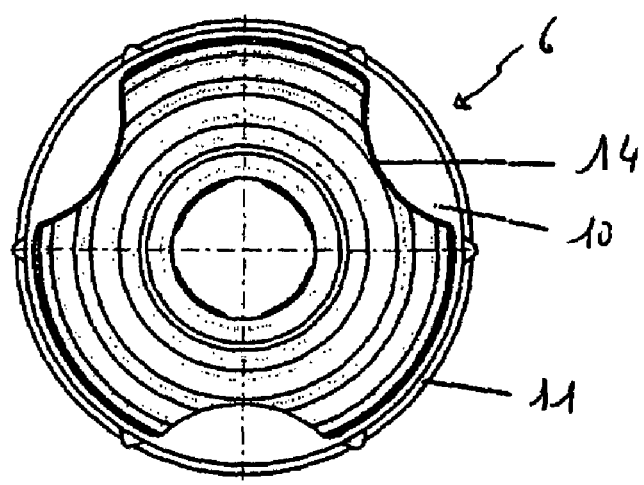
FIG. 4 shows a side view of another embodiment of a socket according to the invention.
Figure 5:
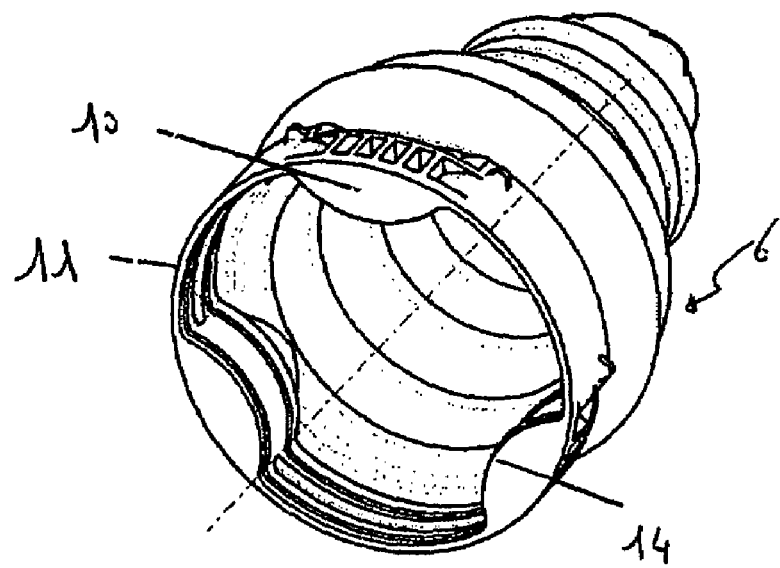
FIG. 5 shows a perspective view of the socket of FIG. 4.
Figure 6:
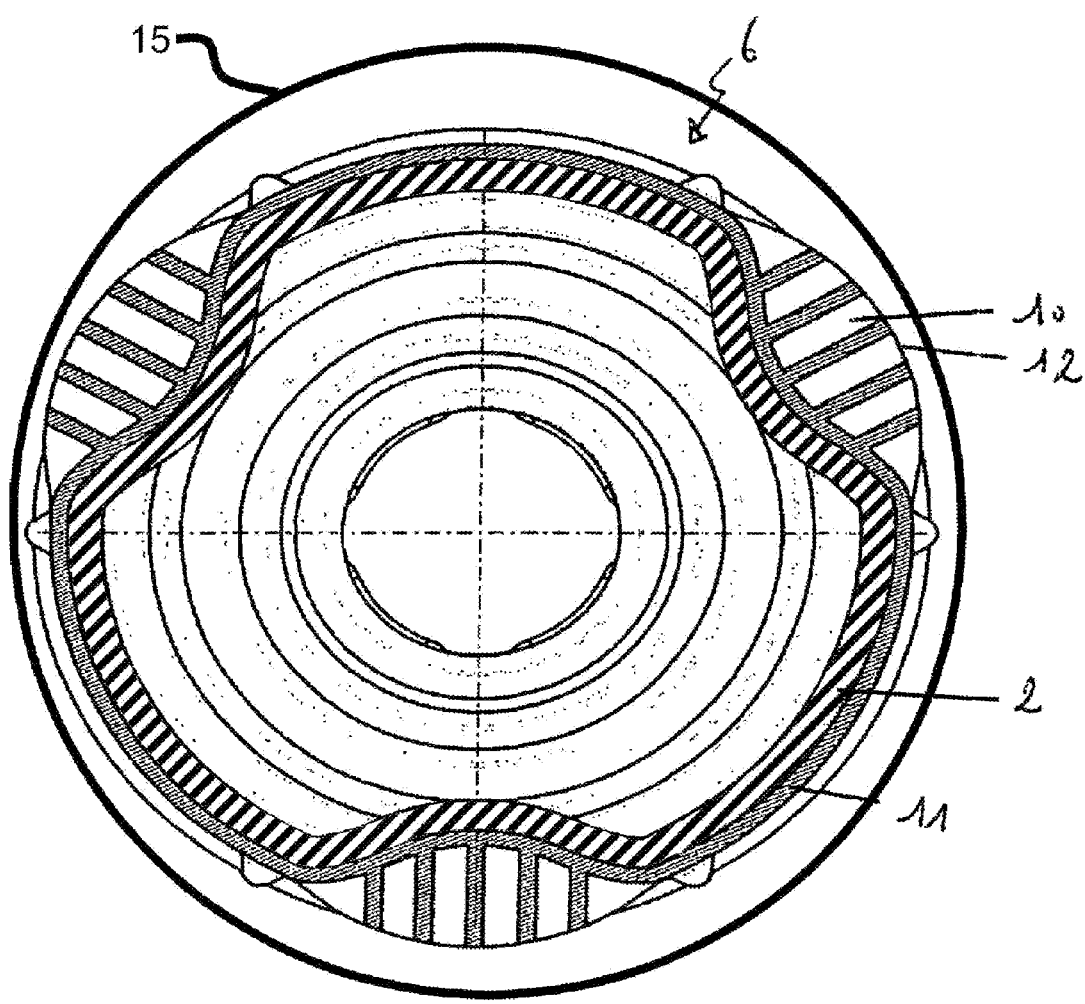
FIG. 6 shows a side view of the large base of a socket according to the invention in the mounted state on a multilobed connection element of the transmission.

In another embodiment, shown in FIGS. 4 and 5, the reinforcement 14 is provided by an extra internal radial thickness of the multilobed wall of the socket 6. Actually, in this case, and this can be visible by comparison between FIG. 4 and FIG. 2, the walls of greater thickness, corresponding to the zone of the lobes of the socket, are reinforced in the direction of the inside of the socket to create a zone that will be susceptible to being pre-compressed when the multilobed element 2 of the transmission is fitted into place inside said socket. Thus, when the multilobed element 2 or bell of the mechanical connection of the transmission joint is shrunk-on inside the large base of the socket, a pre-compression of the multilobed wall of the socket is generated at the reinforcement zones 14. In addition to this pre-compression, a deformation of the external peripheral wall of the end 7 of this socket results therefrom to obtain a shape that is in accordance with the one that is shown in FIG. 6 that constitutes the equivalent of the multilobed wall shape of the socket that would have been obtained in the case of a reinforcement provided by an extra external radial thickness of the multilobed wall of the socket.

Consequently, the two embodiments are two equivalent modes. In one case, an external shape of the multilobed wall of the non-circular socket in the non-mounted state of the socket on the multilobed element 2 of the mechanical connection of the transmission is selected whereas, in the other case, an internal shape of the multilobed wall of the non-complementary socket of the bell is selected to generate a pre-compression of said multilobed wall of the socket. In this latter case, the peaks of the lobes of the multilobed wall are placed on a circle with a radius that is less than the radius of the circle that passes through the base of the concave portions of the bell. Regardless of the embodiment retained, the effect that is obtained is equivalent, namely to obtain an external radial bulge 12 of the wall of the socket 6 in the mounted state of the socket on the multilobed connection element 2. When the reinforcement 13 is provided by an extra external radial thickness of the multilobed wall of the socket 6, it is possible to identify visually such a socket since a non-circular external peripheral wall of the socket results therefrom, contrary to the state of the art. When the reinforcement 14 is provided by an extra internal radial thickness of the multilobed wall of the socket, it will be sufficient to note that the shape of the bell is not perfectly complementary to the shape of the socket to visualize the object of the invention. Furthermore, in the mounted state of the socket on the multilobed element 2 of the articulated mechanical connection of the transmission, the object of the invention clearly seems to be as FIG. 6 illustrates it. It is noted that if the objective is in general to balance the tightening forces between the thin portions and the reinforced portions of the multilobed wall, the object of the invention makes it possible in a more general manner to increase locally a tightening force for the purpose of, for example, reinforcing the tightening force that applies in a zone that is susceptible to leaks.

The invention claimed is:

1. A transmission joint, comprising:
    first and second drive shafts (3, 1), the first drive shaft having a multilobed element arranged to engage the second drive shaft to create an articulated mechanical connection between the first and second drive shafts; and
    an elastic socket (6) connecting the two shafts, the elastic socket comprising:
        first and second ends, the first end arranged with respect to the two drive shafts so that the first end overlies the multilobed element of the first drive shaft;
        a wall disposed at the first end of the elastic socket, the wall having alternating regions of relatively greater and lesser thickness, the regions of greater thickness defining socket lobes;
    a tightening collar arranged to surround the wall and apply a compression force to an outside face of the wall;
    wherein the socket and the first drive shaft are constructed and arranged so that when the socket is installed so that the wall surrounds the multilobed element of the first drive shaft, and without the compression force of the tightening collar applied, the outside face of the wall is non-circular, such that the socket lobes of relatively greater thickness further form bulges in the outside face that outwardly extend a greater distance from a longitudinal axis of the socket than the outside face at the regions of lesser thickness to balance tightening forces among the regions of alternating greater and lesser thickness.

2. The transmission joint according to claim 1, wherein the elastic socket is structured and arranged so that when the elastic socket is not mounted on the first and second drive shafts, and the compression force is not applied to the outside face of the wall, the outside face of the wall at the regions of relatively greater thickness lies outward of the outside face of the wall at the regions of relatively lesser thickness.

3. The transmission joint according to claim 2, wherein each of the socket and the connection element of the first drive shaft is tri-lobed.

4. The transmission joint according to claim 1, wherein the elastic socket is structured and arranged so that when the elastic socket is not mounted on the first and second drive shafts, and the compression force is not applied to the outside face of the wall, an inside face of the wall at the regions of relatively greater thickness lies inward of the inside face of the wall at the regions of relatively lesser thickness.

5. The transmission joint according to claim 4, wherein each of the socket and the connection element of the first drive shaft is tri-lobed.

6. The transmission joint according to claim 1, wherein each of the socket and the connection element of the first drive shaft is tri-lobed.

7. The transmission joint according to claim 1, wherein the socket has a cylindrical-conical shape including a number of coils defining a bellows.

8. The transmission joint according to claim 1, wherein the elastic socket is structured and arranged so that when the elastic socket is not mounted on the first and second drive shafts, and the compression force is not applied to the outside face of the wall:
    an inside face of the wall at the regions of relatively greater thickness lies inward of the inside face of the wall at the regions of relatively lesser thickness; and
    the outside face of the wall is circular.

9. A socket for covering an articulated mechanical connection, the socket comprising:
    a multilobed end comprising a wall constructed and arranged for covering, upon contact, a multilobed element of the articulated mechanical connection the wall having alternating regions of relatively greater and lesser thickness, the regions of greater thickness defining socket lobes;
    a tightening element arranged to surround the wall and apply a compression force to an outside face of the wall;
    wherein the socket is arranged so that when the socket is installed on the multilobed element of the articulated mechanical connection, and without the compression force of the tightening collar applied, the outside face of the wall is non-circular, such that the socket lobes of relatively greater thickness further form bulges in the outside face that outwardly extend a greater distance from a longitudinal axis of the socket than the outside face at the regions of lesser thickness to balance tightening forces among the regions of alternating greater and lesser thickness.

10. The socket according to claim 9, wherein the outside face of the wall at the regions of relatively greater thickness lies outward of the outside face of the wall at the regions of relatively lesser thickness.

11. The socket according to claim 9, wherein the inside face of the wall at the regions of relatively greater thickness lies inward of the inside face of the wall at the regions of relatively lesser thickness.

12. The socket (6) according to claim 9, wherein the tightening element is a collar that surrounds the multilobed end (7) of the socket (6).

13. The socket according to claim 9, wherein the inside face of the wall at the regions of relatively greater thickness lies inward of the inside face of the wall at the regions of relatively lesser thickness; and
    the outside face of the wall is circular.

* * * * *